May 5, 1931. J. J. AGRIMSON 1,804,194
CREAM COOLER
Filed Oct. 27, 1930
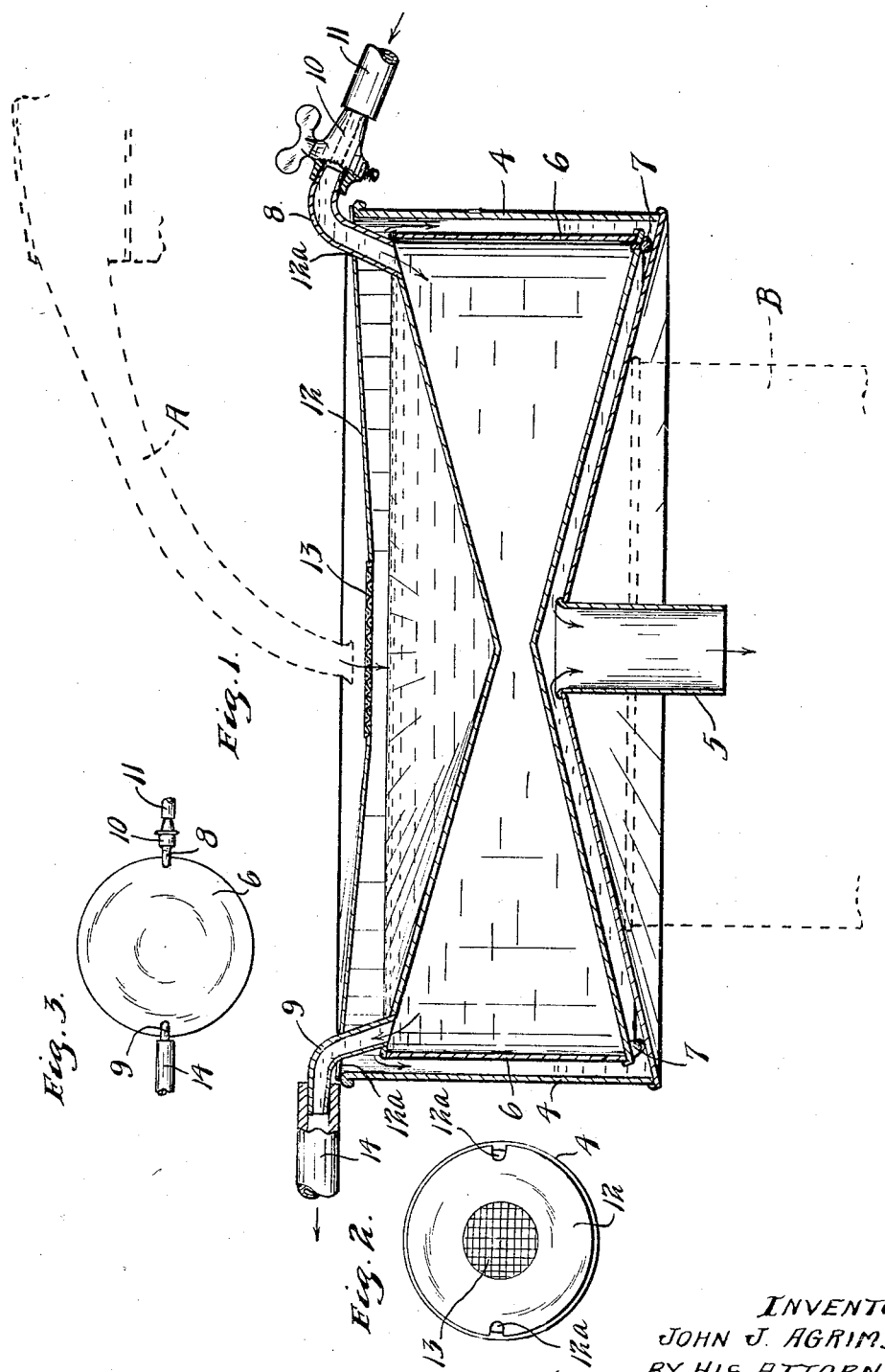
INVENTOR.
JOHN J. AGRIMSON.
BY HIS ATTORNEYS.

Patented May 5, 1931

1,804,194

UNITED STATES PATENT OFFICE

JOHN J. AGRIMSON, OF RUSHFORD COUNTY, MINNESOTA

CREAM COOLER

Application filed October 27, 1930. Serial No. 491,482.

This invention relates to cream coolers and aerators.

It is the main object of the present invention to provide a novel and improved cream cooler and aerator of cheap and simple construction which can be used to rapidly absorb the animal heat from cream, while at the same time aerating the cream to prevent the development of undesirable bacteria in the cream.

In a broader sense, it is the object of the present invention to provide a novel device for producing a rapid interchange of heat between two different mediums of initially different temperatures.

To these ends, the invention consists in the novel parts and novel combinations of parts, hereinafter defined in the claims and described in the following specification, made in connection with the accompanying drawings, wherein like reference characters refer to the same or similar parts throughout the various views and, in which, Fig. 1 is a vertical sectional view taken through a cream cooler embodying the present invention, a nozzle from a cream separator being indicated in dotted lines and the upper portion of a milk can being indicated in dotted lines;

Fig. 2 is a plan view of the device shown in Fig. 1, with the inner drum removed; and Fig. 3 is a plan view of the inner drum.

Referring to the drawings, in accordance with the present invention, there is provided a pan 4 having circular and vertical side walls terminating preferably in an upper beaded edge, said pan having a conical and upwardly extending bottom. An opening is provided in the upper central portion of the bottom of pan 4 and a downwardly extending tube 5 is mounted in this opening. A cylindrical drum 6 of smaller diameter than the diameter of the pan 4 is disposed within the pan and this drum has a downwardly extending conical top and an upwardly extending conical bottom. In order that the bottom of the drum 6 may be properly spaced from the bottom of the pan 4, a plurality of small round knobs 7 are secured to the lower outer edge of the drum 6 and these knobs rest on the bottom of the pan 4. An inlet water tube 8 of preferably angular shape is connected to the top of the drum 6 at one side thereof and a similar water outlet tube 9 is connected to the top of the drum 6 at a point preferably diametrically opposite to the point of connection of the tube 8 to the drum. A valve 10 is preferably connected to the outer end of one of the tubes 8 or 9, such as the inlet tube 8, and a hose 11 running from any suitable source of water supply is connected to the valve 10. A drainage hose 14 is connected to the outer end of the tube 9. A cover 12, preferably of truncated conical shape, rests on the upper edge of the pan 4 and projects somewhat downwardly therein, the central opening in the cover 12 being screened by a screen 13. The cover 12 has notches 12a cut therein at diametrically opposite points to accommodate the tubes 8 and 9.

In use for cooling cream, cold water will be continuously supplied through the hose 11, valve 10 and tube 8 to the drum 6. The water may drain from the drum through the tube 9 and drainage hose 12, so that at all times all surfaces of the drum will be maintained in cold condition. As the milk is separated, the cream from the separator may be carried through the separator nozzle A shown in dotted lines Fig. 1, to be discharged directly onto the screen 13 in cover 12. The screen 13 will strain the cream and the cream will be carried downwardly to be received in the conical dish formed by the top of the drum 6. The cream will here come in contact with the cold surface of the top of the drum and a great deal of the heat from the cream will be absorbed. When sufficient cream has been carried to the dish formed by the top of the drum to fill the dish, the cream will overflow and will run downwardly over the cold side walls of the drum in fine streams. As the cream runs downwardly over the side walls of the drum, it will accumulate in the lower portion of the drum, between the bottom of the pan 4 and the bottom of the drum, until the level of cream in the pan has been raised to the level of the upper end of the tube 5. The cream will thus come in contact with the cold surface of the bottom of the drum 6 and will be cooled by this surface. When the level of cream in the bottom of the pan has been raised to the level of the upper end of the tube 5, the cream will, of course, flow through the tube and may be caught as in the milk can B shown in dotted lines Fig. 1, upon which the cooler will preferably be supported. Gases arising from the cream as it is being cooled, may run upwardly and through the screen 13 so that the cream will be thoroughly aerated at the same time that it is being cooled. The drum 6 will center itself in the pan 4 due to the knobs 7 and to the action of the cream that will be held within the lower portion of the pan. The proper spacing is, therefore, at all times maintained between the side walls of the drum and the side walls of the pan. By manipulating the valve 10, the velocity of flow of water through the drum 6 can be regulated so that the drum may be maintained at all times at the desired temperature.

Although the present invention is primarily intended for use in cooling cream, milk, etc., it will be understood that the device can be used for cooling or heating any liquid. A hot or a cold liquid can be passed through the drum 6 and a hot or a cold liquid can be discharged into the dish formed by the top of the drum. It will be understood that the words "cream cooler" as used in the claims must be taken to have a broad enough interpretation to cover either a cooling or heating device. It will be further understood that if desired, the cream or other liquid to be treated may be passed through the drum 6, while the cooling or heating liquid may be discharged directly into the dish formed by the top of the drum.

The parts of the device are few and simple and the parts may be quickly disassembled for ready and thorough cleansing. When the device is used for cooling cream, a very effective cooling action is obtained inasmuch as all surfaces of the drum are utilized in producing the cooling action. Also the cream is subjected to the cooling action for a considerable period of time and much more effective results are obtained than where the cream is passed continuously over a cooled surface. The body or animal heat can be very rapidly removed from the cream and the cream may be properly aerated to prevent the development of undesirable bacteria in the cream. There are no movable parts that can get out of order and practically no attention need be given to the device when in use.

It will, of course, be understood that various changes may be made in the form, details, arrangement and proportions of the various parts without departing from the scope of the present invention.

What is claimed is:—

1. A cream cooler comprising, a pan, a drum disposed within said pan, inlet and outlet water connections for said drum, said drum having a centrally depressed top surface, and a discharge conduit extending downwardly from the bottom of said pan.

2. A cream cooler comprising, a pan having a bottom with an upwardly raised central portion, an outlet conduit extending from the upwardly raised portion of said bottom, a drum disposed within said pan, inlet and outlet water connections for said drum, said drum having a centrally depressed top surface and a bottom with an upwardly raised central portion, and means for spacing the bottom of said drum from the bottom of said pan.

3. A cream cooler comprising, a pan having a conical and upwardly projecting bottom, a conduit extending downwardly from the upwardly projecting portion of said bottom, a drum disposed within said pan, inlet and outlet water connections for said drum, said drum having a downwardly extending conical top and an upwardly extending conical bottom and means for spacing the bottom of said drum from the bottom of said pan.

4. A cream cooler comprising, a pan having vertical and circular walls and an upwardly extending conical bottom provided with a central opening, a cylindrical drum of less diameter than the diameter of said pan and resting within said pan, said drum having a downwardly extending conical top and an upwardly extending conical bottom, inlet and outlet water connections for said drum and means for spacing the bottom of said drum from the bottom of said pan.

In testimony whereof I affix my signature.

JOHN J. AGRIMSON.